United States Patent
Wang et al.

(10) Patent No.: US 11,082,936 B2
(45) Date of Patent: Aug. 3, 2021

(54) DEVICE TIME SYNCHRONIZATION CONTROL METHOD AND SYSTEM IN WIRELESS MESH NETWORK

(71) Applicant: SHENZHEN SENDIS SEMICONDUCTOR CO., LTD, Guangdong (CN)

(72) Inventors: Wenpan Wang, Shenzhen Guangdong (CN); Yanquan Mai, Shenzhen Guangdong (CN); Xunsheng Deng, Shenzhen Guangdong (CN); Bo Chen, Shenzhen Guangdong (CN)

(73) Assignee: Shenzhen Sendis Semiconductor Co., Ltd, Guangdong (CN)

( * ) Notice: Subject to any disclaimer, the term of this patent is extended or adjusted under 35 U.S.C. 154(b) by 62 days.

(21) Appl. No.: 16/621,592
(22) PCT Filed: May 9, 2018
(86) PCT No.: PCT/CN2018/086113
§ 371 (c)(1),
(2) Date: Dec. 11, 2019
(87) PCT Pub. No.: WO2018/228093
PCT Pub. Date: Dec. 20, 2018

(65) Prior Publication Data
US 2020/0107281 A1 Apr. 2, 2020

(30) Foreign Application Priority Data
Jun. 15, 2017 (CN) .......................... 201710452652.2

(51) Int. Cl.
H04W 4/00 (2018.01)
H04W 56/00 (2009.01)
(Continued)

(52) U.S. Cl.
CPC ......... *H04W 56/001* (2013.01); *H04L 7/0087* (2013.01); *H04W 84/18* (2013.01)

(58) Field of Classification Search
None
See application file for complete search history.

(56) References Cited

U.S. PATENT DOCUMENTS

| 10,292,236 B2* | 5/2019 | Chen ...................... H05B 47/10 |
| 2009/0120204 A1* | 5/2009 | Mitsutake ................. G01F 1/60 73/861.16 |

(Continued)

FOREIGN PATENT DOCUMENTS

| CN | 101174939 A | 5/2008 |
| CN | 101435710 A | 5/2009 |

(Continued)

*Primary Examiner* — Phuongchau Ba Nguyen
(74) *Attorney, Agent, or Firm* — Muncy, Geissler, Olds & Lowe, P.C.

(57) ABSTRACT

Device time synchronization control method in wireless mesh network, comprising: pulse converter converts input AC into periodic pulse signal; controller sends time setting instruction to adjacent node device at preset time; adjacent node device updates device time according to preset algorithm when periodic signal is on rising edge or falling edge, take updated device time as setting time and forward to other adjacent node devices before arrival of next rising edge or falling edge; other adjacent devices update own device time when periodic signal is on rising edge or falling edge; after all node devices finish updating device time, controller sends control commands, and all node devices execute synchronously upon arrival of execution time. Node devices update own time according to pulse signal changes, realizing clock synchronization and synchronization control over node devices by uniform execution time.

11 Claims, 4 Drawing Sheets (51) Int. Cl.
 H04L 7/00 (2006.01)
 H04W 84/18 (2009.01)

(56) References Cited

U.S. PATENT DOCUMENTS

2010/0265936 A1  10/2010  Yeh et al.
2012/0059936 A1   3/2012  Bauchot et al.

FOREIGN PATENT DOCUMENTS

CN    102118849 A    7/2011
CN    107277914 A   10/2017

\* cited by examiner

DEVICE TIME SYNCHRONIZATION CONTROL METHOD AND SYSTEM IN WIRELESS MESH NETWORK

CROSS REFERENCE TO RELATED APPLICATIONS

This application is a national stage application of PCT Patent Application No. PCT/CN2018/086113, filed on 9 May 2018, which claims priority to Chinese Patent Application No. 201710452652.2, filed on 15 Jun. 2017, the content of all of which is incorporated herein by reference.

FIELD OF THE INVENTION

The present invention relates to the technical field of smart home, and more particularly, to a method and a system for a device time synchronization control in a wireless mesh network.

BACKGROUND

A smart home communication uses a wireless mesh network to connect a plurality of smart home appliances. By using the wireless mesh network, it is possible to realize that a network node connects to one or more other adjacent network nodes, in a wireless multi-hop manner, but when it is necessary to control a plurality of smart home devices to work in a synchronized manner. It is usually difficult to achieve a full synchronization, especially when a mesh network is relatively large and there are a plurality of nodes, a synchronization control for a plurality of nodes will not be guaranteed. Each device uses a different clock source, resulting in a difference in a device time, and the difference increases when time is longer.

Figure 1:
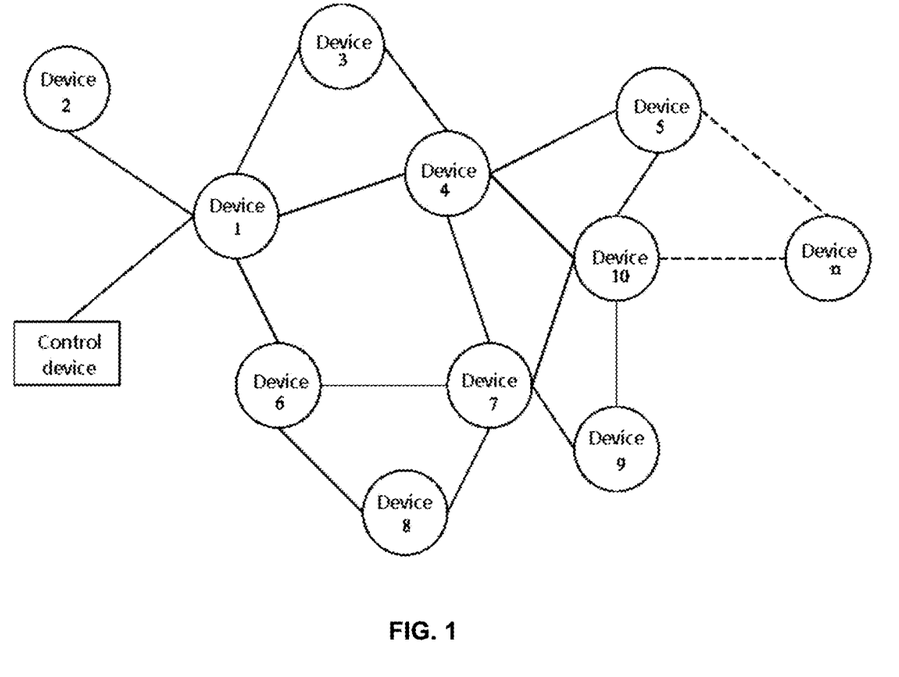
FIG. 1 illustrates a schematic diagram of data transmission between the control device and each of the node devices in a wireless mesh network.

Shown as FIG. 1, if a control device needs to control a device 1 and a device 9 at a same time, the device 1 will receive and execute an instruction sent from the control device first, while the device 9 will not receive a control command until the control command has been forwarded for a plurality of times, thus the device 1 and the device 9 are impossible to execute the instruction at the same time.

Therefore, the current technology needs to be improved and developed.

BRIEF SUMMARY OF THE INVENTION

According to the above described defects in the prior art, the purpose of the present invention is providing a method and a system for a device time synchronization control in a wireless mesh network, by using a periodicity of an alternating current (AC), an alternating sinusoidal voltage signal is converted into a periodic pulse signal, before controlling each node device to update a time of its own according to a change of the pulse signal, so as to realize a clock synchronization, and on a basis of the clock synchronization, a synchronization control of all of the node devices is realized by using a unified execution time.

A technical solution of the present invention to solve the technical problems is as follows:

A method for a device time synchronization control in a wireless mesh network, wherein comprising a plurality of following steps:

A, converting an input AC into a periodic pulse signal through a pulse converter;

B, a controller sending a time setting instruction to one or more adjacent node devices at a preset time;

C, the one or more adjacent node devices updating a device time according to a preset algorithm when the pulse signal is at a rising edge or a falling edge, and forwarding an updated device time as a setting time to one or more other adjacent node devices before a next rising edge or falling edge arrives;

D, the one or more other adjacent devices updating the device time of their own according to the setting time and the preset algorithm at the rising edge or the falling edge;

E, after all of the node devices have finished updating the device time, the controller sending a control command to each of the node devices, and all of the node devices executing the control command synchronously when an execution time arrives.

The method for the device time synchronization control in the wireless mesh network, wherein the step B comprising:

B1, determining whether the controller is currently connecting to an AC power, if so, then executing a step B2, otherwise executing a step B3;

B2, the controller sending the time setting instruction to the one or more adjacent node devices when the pulse signal is at the rising edge or the falling edge;

B3, the controller sending an instruction of acquiring a synchronization flag to the node devices connected to the AC power, and sending the time setting instruction to the one or more adjacent node devices after receiving the synchronization flag fed back by the node devices.

The method for the device time synchronization control in the wireless mesh network, wherein the step B3 comprising:

B31, the controller sending an instruction of acquiring the synchronization flag to the node devices connected to the AC power;

B32, the node devices determining whether the instruction of acquiring the synchronization flag is a new instruction or not, and if so, the synchronization flag will be fed back to the controller when the pulse signal is at the rising edge or the falling edge;

B33, the controller sending the time setting instruction to the one or more adjacent node devices after receiving the synchronization flag.

The method for the device time synchronization control in the wireless mesh network, wherein the step B2 comprising specifically:

the controller sending the time setting instruction of setting time as T to the one or more adjacent node devices when the pulse signal is at the rising edge or the falling edge, wherein T is a current time.

The method for the device time synchronization control in the wireless mesh network, the step B33 comprising specifically:

the controller sending the time setting instruction of setting time as Tc-Tsf to the one or more adjacent node devices, after receiving the synchronization flag, wherein Tc is a time when the controller receiving the synchronization flag, Tsf is a sending period of the synchronization flag.

The method for the device time synchronization control in the wireless mesh network, wherein the step C comprises:

C1, determining whether the time setting instruction is a new instruction or not, if so, updating the device time to the setting time plus a pulse signal period, when the pulse signal is at the rising edge or the falling edge;

C2, before the next rising edge or falling edge arrives, forwarding the updated device time to one or more other adjacent node devices as the setting time.

The method for the device time synchronization control in the wireless mesh network, wherein the step D comprising specifically:

the one or more other adjacent node devices continuing updating the device time to the setting time plus the pulse signal period, when the pulse signal is at a rising edge or a falling edge, before returning to the step C2, until all of the node devices having finished updating the time.

The method for the device time synchronization control in the wireless mesh network, wherein the step C1 comprising:

C11, determining whether a command sequence number of the time setting instruction currently received is greater than a previous command sequence number, and if so, the time setting instruction currently received is determined as a new instruction, and a step C12 will be executed; otherwise, the time setting instruction will not be executed;

C12. Updating a self time thereof to the setting time plus the pulse signal period when the pulse signal is at the rising edge or the falling edge.

The method for the device time synchronization control in the wireless mesh network, wherein the step E comprising:

E1, after all of the node devices have finished updating the time, the controller sending a control command containing an executing time number to each of the node devices;

E2, each of the node devices determining if itself is a target device according to the control command or not, if so, then each of the target devices executes the control command synchronously when the device time arrives at the executing time number.

A system for the device time synchronization control in the wireless mesh network, comprising a controller and a plurality of node devices, wherein further comprising:

a pulse converter, applied to converting an input AC into a periodic pulse signal;

the controller comprises an instruction transfer module, applied to sending a time setting instruction to one or more adjacent node devices at a preset time;

the node devices comprise a time renewal and forward module, applied to updating the device time according to a preset algorithm when a pulse signal is at a rising edge or a falling edge, and forwarding the updated device time to one or more other adjacent node devices as a setting time, before a next rising edge or falling edge arrives;

the controller further comprises an instruction control module, applied to sending a control command to each of the node devices, when all of the node devices have completed updating the device time;

the node devices further comprise an executing and control module, applied to controlling all of the node devices to execute the control command synchronously when an executing time arrives.

Comparing to the prior art, the method for the device time synchronization control in the wireless mesh network as provided in the present invention, wherein the method for the device time synchronization control in the wireless mesh network converts an input AC into a periodic pulse signal through a pulse converter; then a controller sends a time setting instruction to one or more adjacent node devices at a preset time; then the one or more adjacent node devices update the device time according to a preset algorithm when the pulse signal is at a rising edge or a falling edge, and forward an updated device time as a setting time to one or more other adjacent node devices before a next rising edge or falling edge arrives; then the one or more other adjacent devices update the device time thereof according to the setting time and a preset algorithm at the rising edge or the falling edge; after all of the node devices have completed updating the device time, the controller sends a control command to each of the node devices, and all of the node devices execute the control command synchronously when an execution time arrives, converting an alternating sinusoidal voltage signal into a periodic pulse signal by using a periodicity of an AC, before controlling each node device to update a time thereof according to a change of the pulse signal, so as to realize a clock synchronization, and on a basis of the clock synchronization, a synchronization control of all of the node devices is realized by using a unified execution time.

DETAILED DESCRIPTION OF EMBODIMENTS

According to a plurality of defects in the prior art that, a plurality of smart devices are unable to achieve a full synchronization, the purpose of the present invention is providing a method and a system for a device time synchronization control in a wireless mesh network, converting an alternating sinusoidal voltage signal into a periodic pulse signal by using a periodicity of an alternating current (AC), before controlling each node device to update a time of its own according to a change of the pulse signal, so as to realize a clock synchronization, and on a basis of the clock synchronization, a synchronization control of all of the node devices is realized by using a unified execution time.

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described herein are used to explain the present invention only, instead of limiting the present invention.

Figure 2:
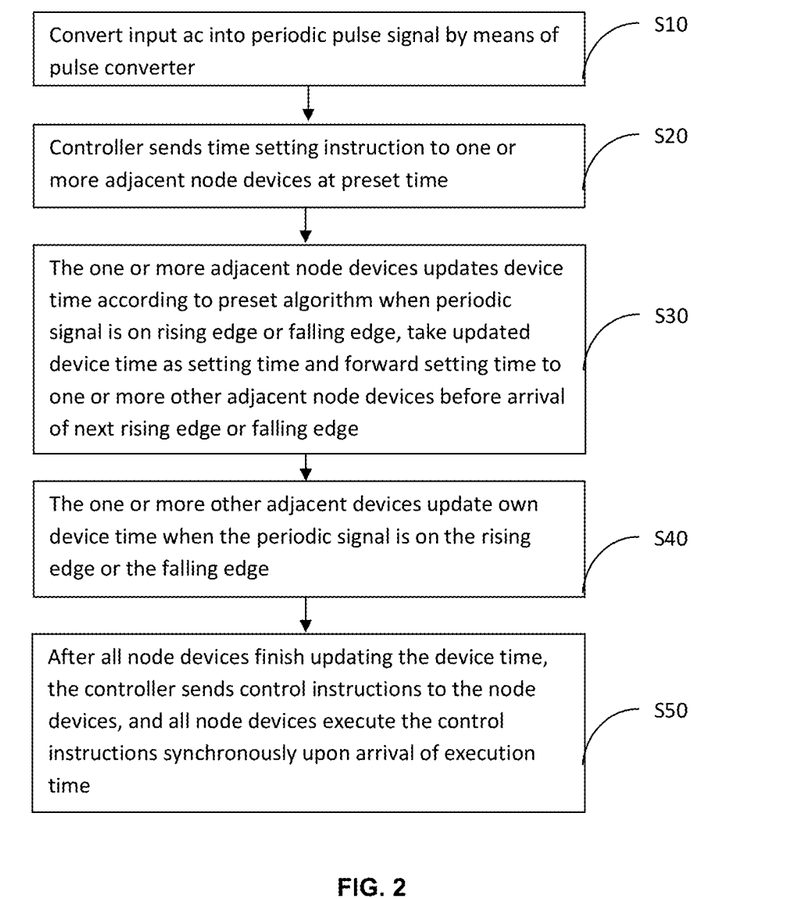
FIG. 2 illustrates a flow chart on the method for the device time synchronization control in a wireless mesh network as provided in the present invention.

Referencing to FIG. 2, the method for the device time synchronization control in a wireless mesh network as provided in the present invention comprises a plurality of following steps:

S10, converting an input AC into a periodic pulse signal through a pulse converter;

S20, a controller sends a time setting instruction to one or more adjacent node devices at a preset time;

S30, the one or more adjacent node devices update a device time according to a preset algorithm when the pulse signal is at a rising edge or a falling edge, and forward an updated device time as a setting time to one or more other adjacent node devices before a next rising edge or falling edge arrives;

S40, the one or more other adjacent devices update a device time of their own according to the setting time and the preset algorithm at the rising edge or the falling edge;

S50, after all of the node devices have finished updating the device time, the controller sends a control command to each of the node devices, and all of the node devices execute the control command synchronously when an execution time arrives.

Figure 3:
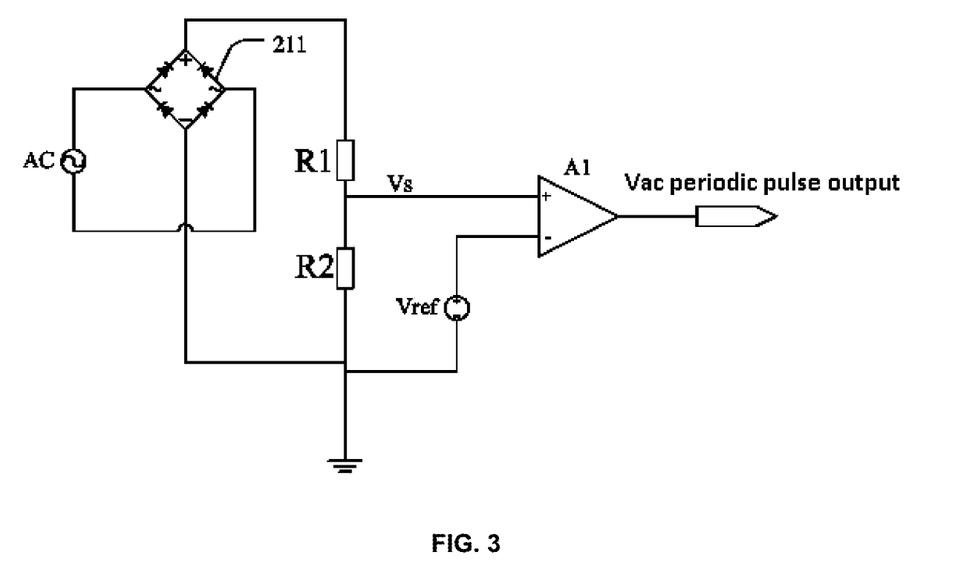
FIG. 3 illustrates a circuit diagram on the pulse converter in the method for the device time synchronization control in a wireless mesh network as provided in the present invention.
Figure 4:
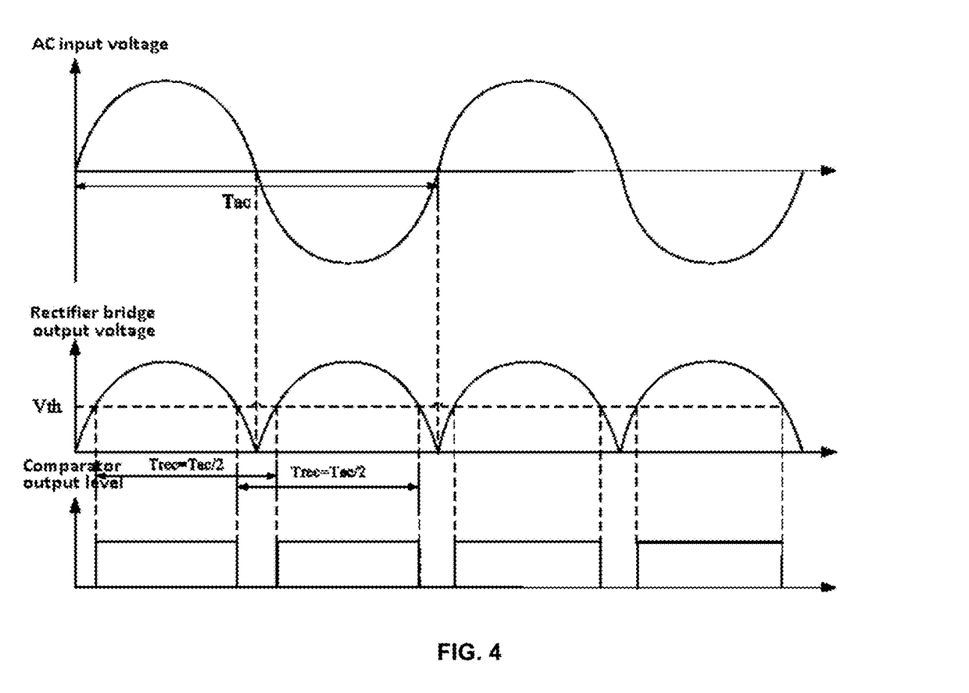
FIG. 4 illustrates a schematic diagram on an input voltage, an output voltage and an output level of the pulse converter in the method for the device time synchronization control in a wireless mesh network as provided in the present invention.

The step S10, wherein by using a pulse converter, an alternating sinusoidal voltage signal is converted into a periodic pulse level signal, a period of a pulse signal is one half of the sinusoidal voltage signal, in a specific implementation, referencing to FIG. 3 and FIG. 4 together, the present invention adopts a pulse converter shown as FIG. 3 to achieving a signal conversion, a specific process is: the AC is rectified and processed by a rectifier bridge before outputting a direct current (DC) power supply, an output voltage generates a Vs after being divided by a voltage dividing resistor, a first resistor R1 and a second resistor R2, before being input into an in-phase terminal of a comparator, and compared with a reference voltage Vref input from an out-phase terminal, when the Vs is larger than the Vref, a high level is output, otherwise a low level is output. Combining with FIG. 4, it can be seen that, in a normal power supply case, the comparator outputs a periodic pulse level signal, a period Trec thereof is one half of an AC period Tac, followed by using such a pulse signal to update a device time of each node device, so as to realize a clock synchronization.

The step S20, wherein a controller sends a time setting instruction to one or more adjacent node devices at a preset time, may be divided into two cases: one case is that, the controller has connected to an AC power, and been able to receive the pulse signal output by the pulse converter, another case is that, the controller has not connected to an AC power, and there is no way to receive the pulse signal directly, thus, the step S20 comprises a plurality of steps:

S21, determining whether the controller is currently connecting to the AC power, if so, then executing a step S22, otherwise executing a step S23;

S22, the controller sends a time setting instruction to the one or more adjacent node devices when the pulse signal is at the rising edge or the falling edge;

S23, the controller sends an instruction of acquiring a synchronization flag to the node devices connected to the AC power, and sends a time setting instruction to the one or more adjacent node devices after receiving the synchronization flag fed back by the node devices.

That is, the controller sends the time setting instruction at a different time under a different condition, when the controller has connected to the AC power, the controller sends the time setting instruction to the one or more adjacent node devices when the pulse signal is at the rising edge or the falling edge, that is, now the preset time is at the rising edge or the falling edge of the pulse signal, accordingly, the one or more adjacent node devices update the device time according to the preset algorithm when the pulse signal is at the rising edge or the falling edge, that is, if the controller sends the time setting instruction to the node devices when at the rising edge, then the node device updates the device time according to the preset algorithm also at the rising edge. A same principle happens to the falling edge, so as to guarantee following time synchronization.

When the controller has not connected to the AC power, then the controller first sends an instruction of acquiring a synchronization flag to a plurality of node devices having connected to the AC power, to obtain a time of the rising edge or the falling edge, and after receiving the synchronization flag fed back by the node devices, the controller sends a setting instruction to the one or more adjacent node devices, that is, now the preset time is a time of receiving the synchronization flag fed back by the node device.

Specifically, the step S23 comprises a plurality of steps:

S231, the controller sends an instruction of acquiring a synchronization flag to the node devices connected to the AC power;

S232, the node devices determine whether the instruction of acquiring the synchronization flag is a new instruction or not, and if so, the synchronization flag will be fed back to the controller when the pulse signal is at the rising edge or the falling edge;

S233, the controller sends the time setting instruction to the one or more adjacent node devices after receiving the synchronization flag.

When the node devices receive the instruction of acquiring the synchronization flag sent by the controller, first a determination that if the instruction of acquiring the synchronization flag is a new instruction or not is decided, if it is a new instruction, then the node devices will feed back the synchronization flag to the controller when the pulse signal is at the rising edge or the falling edge, now the rising edge or the falling edge is also applied for a plurality of node devices following-up to update the device time of their own, after receiving the synchronization flag, the controller sends the time setting instruction to the one or more adjacent node devices; if it is not a new instruction, then it is neglected.

According to both cases of sending the time setting instruction described above, a setting time contained in the time setting instruction is also different, so as to adapt the time of sending both instructions described above, that is, the step S22 comprises specifically: the controller sends a time setting instruction having a setting time of T to the one or more adjacent node devices when the pulse signal is at the rising edge or the falling edge, wherein T is a current time.

While the step S233 comprises specifically: the controller sends a time setting instruction of setting time as Tc-Tsf to the one or more adjacent node devices, after receiving the synchronization flag, wherein Tc is a time of the controller receiving the synchronization flag, Tsf is a sending period of the synchronization flag.

If the controller is connected to the AC power, then when the pulse converter outputs a signal at the rising edge or the falling edge, the controller sends out a time setting instruction, now the time is T, and the setting time contained in the time setting instruction is T, that is also the time of generating the rising edge or the falling edge; if the controller is not connected to the AC power, the controller sends the instruction of acquiring the synchronization flag to the node devices first, the node devices send the synchronization flag to the controller when the pulse signal is at the rising edge or the falling edge, a sending period of the synchronization flag is Tsf, the controller sends out the time setting instruction after receiving the synchronization flag, and now the time is Tc, thus the setting time in the time setting instruction is Tc-Tsf, by the Tc-Tsf, the time of the node devices sending out the synchronization flag is then calculated, that is the time of generating the rising edge or the falling edge, therefore, no matter the controller has connected to the AC power or not, the setting time in the time setting instruction that the controller sent out is according to a time of a certain rising edge or a certain falling edge, after each node device followed up has updated the device time thereof according to the setting time, all of the node devices are able to realize a time synchronization.

Further, after the controller has sent out the time setting instruction at a different time respectively under the two cases described above, the node devices update the device time according to the setting time in the time setting instruction, specifically, the step S30 comprises:

S31, determining whether the time setting instruction is a new instruction or not, if so, updating the device time to the setting time plus a pulse signal period, when the pulse signal is at the rising edge or the falling edge;

S32, before the next rising edge or falling edge arrives, forwarding the updated device time to the one or more other adjacent node devices as the setting time.

After receiving the time setting instruction sent by the controller, the one or more adjacent node devices first determine if the time setting instruction is a new instruction or not, if so, the device time is updated to the setting time plus a pulse signal period, when the pulse signal is at the rising edge or the falling edge, that is, when the controller connects to the AC power, after receiving the time setting instruction, the one or more adjacent node devices update the device time into T+Trec, when locating at the rising edge or the falling edge, while the controller is not connected to the AC power, after receiving the time setting instruction, the one or more adjacent node devices update the device time into Tc−Tsf+Trec, when locating at the rising edge or the falling edge; then the one or more adjacent node devices forward the updated device time, that is, the T+Trec or Tc−Tsf+Trec, to the one or more other adjacent node devices as the setting time, if a sending period of the time setting instruction is recorded as Tts, then the one or more adjacent node devices shall forward the time setting instruction in a random moment in the period of Trec−Tts. It should be noted that, now the sending period Tts of the time setting instruction shall be less than Trec, if the sending period of the time setting instruction is larger than Trec, but less than 2Trec, then the time is updated to T+2Trec, and so on.

One more step further, the step S40 comprises specifically: the one or more other adjacent node devices continue updating the device time to the setting time plus the pulse signal period, when the pulse signal is at the rising edge or the falling edge, and return to the step S32, until all of the node devices have finished updating the time.

That is, after receiving the time setting instruction containing the setting time of T+Trec or Tc−Tsf+Trec, the one or more other adjacent node devices continue updating the device time to the setting time plus the pulse signal period, when the pulse signal is at the rising edge or the falling edge, that is, updating to T+2Trec or Tc−Tsf+2Trec, since now the time has passed a pulse signal period, the device time of the node device sending the time setting instruction is also same as T+2Trec or Tc−Tsf+2Trec, and so on, after a plurality of N times of sending the time setting instruction, the time of all of the node devices will be T+NTrec or Tc−Tsf+NTrec, thus a time synchronization of the node devices is realized.

Preferably, when receiving the time setting instruction, the node devices first determine if it is a new instruction or not, that is, the step S31 comprises a plurality of steps:

S311, determining whether a command sequence number of the time setting instruction currently received is greater than a previous command sequence number, and if so, the time setting instruction currently received is determined as a new instruction, before a step C12 is executed; otherwise, the time setting instruction will not be executed;

S312. Updating the device time to the setting time plus the pulse signal period when the pulse signal is at a rising edge or a falling edge.

An instruction package sent from the controller contains a command sequence number (CSN), which is a counter, a first instruction sent from the controller CSN=0, a second instruction CSN=1, . . . , and so on, the node devices will save the CSN after receiving the instruction package, and compare to the CSN received before, if the CSN newly received is larger than a saved CSN, then the instruction will be executed, otherwise, the instruction will be neglected, when the node device is forwarding the instructions, the CSN will not be changed, thus by the command sequence number, the time setting instruction is able to be determined as a new instruction or not, of course, a determination process described above is also applicable to determining an instruction of acquiring the synchronization flag, when the CSN newly received is larger than the saved CSN, the node devices update a self time to the setting time plus the pulse signal period, before finishing updating the time, when the pulse signal is at a rising edge or a falling edge.

Further, at a basis of the time synchronization, in order to realize a synchronization control of all of the node devices in a network, the step S50 comprises a plurality of steps:

S51, after all of the node devices have finished updating the time, the controller sends a control command containing an executing time number to each of the node devices;

S52, each of the node devices determines if itself is a target device according to the control command, if so, then each of the target devices executes the control command synchronously when the device time arrives at the executing time number.

At a basis of time synchronization for the devices in the network, a control instruction package sent by the controller contains an action time (AT), marking an action time of the instruction, when receiving the control instruction package, a node device first determines if itself is a target device, if it is a target device and the control instruction is a new instruction, the node device will not execute the instruction right now, instead of waiting for the time thereof arriving at a moment that the AT field marks before executing the instruction. In order to guarantee all of the node devices in the network are able to be controlled synchronously, the AT must be larger than or equal to the time that the control instruction is sent from the controller Tcs plus a period length of the instruction being transmitted to a last device Ttr, that is, Tcs+Ttr, thus although a plurality of target devices receive the instruction package at a different time, since the time of all of the node devices in the network is synchronized after a time updating process described above, thus as long as a moment of an instruction action is agreed, a plurality of target devices will be able to realize a synchronization operation.

Figure 5:
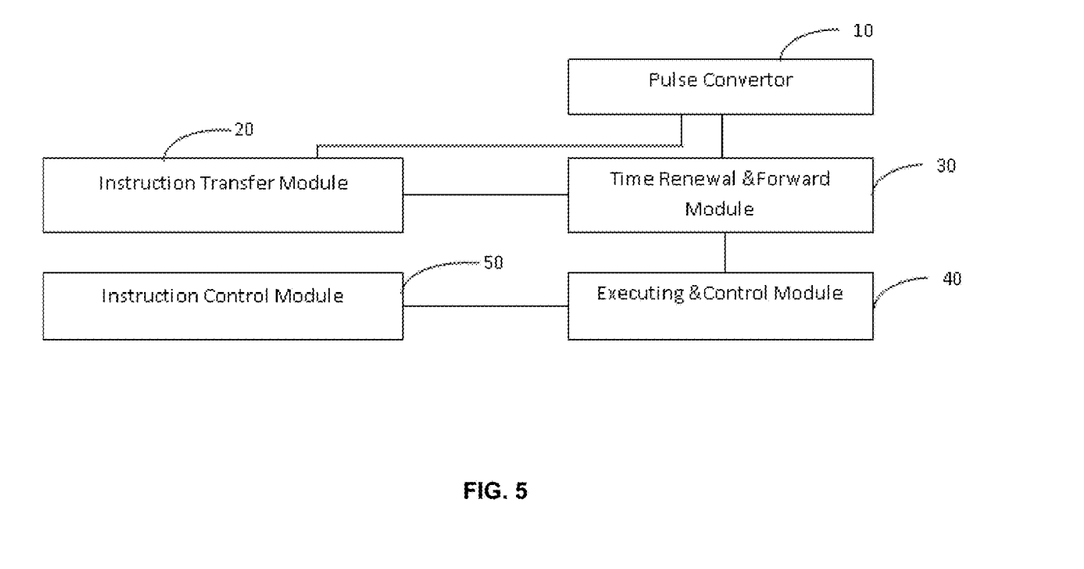
FIG. 5 illustrates a structure diagram on the method for the device time synchronization control in a wireless mesh network as provided in the present invention.

The present invention further provides a system for the device time synchronization control in the wireless mesh network, comprising a controller and a plurality of node devices, shown as FIG. 5, the system further comprises a pulse converter 10, the controller comprises an instruction transfer module 20 and an instruction control module 50, each of the plurality of node devices comprises a time renewal and forward module 30 and an executing and control module 40, the pulse converter 10 connects to the instruction transfer module 20 and the time renewal and forward module 30, the time renewal and forward module 30 further connects to the instruction transfer module 20 and the executing and control module 40, the instruction control module 50 connects to the executing and control module 40, wherein the pulse converter 10 is applied to converting an input AC into a periodic pulse signal; the instruction transfer module 20 is applied to sending a time setting instruction to one or more adjacent node devices at a preset time; the time renewal and forward module 30 is applied to updating the device time according to a preset algorithm, when a pulse signal is at a rising edge or a falling edge, and forwarding the updated device time to one or more other adjacent node devices as a setting time, before a next rising edge or falling edge arrives; the instruction control module 50 is applied to sending a control command to each of the node devices, when all of the node devices have completed updating the device time; the executing and control module 40 is applied to controlling all of the node devices to execute the control command synchronously when an executing time arrives. Details may be referenced to a plurality of embodiments according to the method described above.

Specifically, referencing to FIG. 3 again, the pulse converter 10 comprises a rectifier bridge 211, a first resistor R1, a second resistor R2, a first power supply U1 and a comparator A1, an input end of the rectifier bridge 211 connects to an AC voltage, a positive output end of the rectifier bridge 211 connects to an in phase input terminal of the comparator A1 and one end of the second resistor R2 through the first resistor R1; a positive electrode of the first power supply U1 connects to an out phase input end of the comparator A1, an output end of the comparator A1 connects to the node devices and the controller (when the controller connects to the AC power); a negative output end of the rectifier bridge 211, another end of the second resistor R2 and a negative electrode of the first power supply U1 are all get grounded. Details may be referenced to a plurality of embodiments according to the method described above.

In order to better understand an implementation process of the method for the device time synchronization control in the wireless mesh network, a detailed description to the time synchronization process of the present invention is stated below, combining FIG. 1 to FIG. 4, with a plurality of embodiments:

An AC power is rectified by a rectifier bridge, a Vs generated by an output voltage after being divided by the first resistor R1 and the second resistor R2 is compared to a referencing voltage Vref, if Vs is larger than the Vref, a high level is output, otherwise, a low level is output, thus a comparator outputs a periodic level signal, a period thereof Trec equals to one half of a period of the AC power Tac, the time synchronization process is described below by dividing into two cases:

1. The controller connects to the AC power, when the pulse signal output by the pulse converter is at the rising edge (or the falling edge), now the time is T, and the controller sends out a time setting instruction package—setting the time as T; a plurality of devices in a signal coverage range of the controller (called first level devices) receive the instruction package before determining if it is a new instruction package, if it is a new instruction package, then waiting for the pulse signal output from the pulse converter is at the rising edge (or the falling edge) before updating the device time thereof to T+Trec (now the sending period of the time setting package Tts is less than Trec, if the sending period of the time setting package is larger than Trec, but less than 2Trec, then the time is updated to T+2Trec; and so on), and forwarding out the time setting instruction package at a random moment in a time period of Trec−Tts (that is, before an arrival of a next rising edge or falling edge), now the time is set as T+Trec; if it is not a new instruction package, then it is neglected.

A plurality of devices in a signal coverage range of the first level devices (except for a part of the first level devices, a plurality of other devices are called second level devices), receive the instruction package before determining if it is a new instruction package, if it is a new instruction package, then wait for the pulse signal output from the pulse converter at the rising edge (or the falling edge) before updating the device time thereof to T+2Trec, and forwarding out the time setting instruction package at a random moment in a time period of Trec−Tts, now the time is set as T+2Trec; if it is not a new instruction package, then it is neglected. And so on, then an N-th level device receives a setting time of T+(N−1)Trec in a time setting package of an N−1th level device, waits for the pulse signal output from the pulse converter at the rising edge (or the falling edge) before updating the device time thereof to T+NTrec, and forwarding out the time setting instruction package at a random moment in a time period of Trec−Tts, now the time is set as T+NTrec, and now the time of all of the devices in the network is T+NTrec, the time synchronization is realized.

2. The controller does not connect to the AC power, thus the controller sends an instruction package of acquiring the synchronization flag to a node device among the node devices connected to the AC power, the node device receives the instruction package before determining if it is a new instruction package, if it is a new instruction package, then wait for a signal output from the pulse converter at a rising edge (or a falling edge) and feed back a synchronization flag package to the controller; the controller sends out a time setting instruction package at a same time of receiving the synchronization flag package, a time setting value is the current time Tc minus the sending period of the synchronization flag package Tsf, that is, Tc−Tsf, wherein the sending period of the time setting package Tts+Tsf<Trec, while the time updating process of the node devices followed up is the same as the first case, except for changing the T into Tc−Tsf, no more details are stated herein.

All above, the method for the device time synchronization control in the wireless mesh network as provided in the present invention, wherein the method for the device time synchronization control in the wireless mesh network converts an input AC into a periodic pulse signal through a pulse converter; then a controller sends a time setting instruction to one or more adjacent node devices at a preset time; then the one or more adjacent node devices update the device time according to a preset algorithm when the pulse signal is at a rising edge or a falling edge, and forward an updated device time as a setting time to one or more other adjacent node devices before a next rising edge or falling edge arrives; then the one or more other adjacent devices update the device time thereof according to the setting time and a preset algorithm at the rising edge or the falling edge; after all of the node devices have completed updating the device time, the controller sends a control command to each of the node devices, and all of the node devices execute the control command synchronously when an execution time arrives, converting an alternating sinusoidal voltage signal into a periodic pulse signal by using a periodicity of an AC, before controlling each node device to update a time thereof according to a change of the pulse signal, so as to realize a clock synchronization, and on a basis of the clock synchronization, a synchronization control of all of the node devices is realized by using a unified execution time.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method for a device time synchronization control in a wireless mesh network, wherein comprising a plurality of following steps:

A, converting an input AC (Alternating Current) into a periodic pulse signal through a pulse converter;

B, a controller sending a time setting instruction to one or more adjacent node devices at a preset time, the time setting instruction comprises a setting time;

C, the one or more adjacent node devices updating a device time according to a preset algorithm when the pulse signal is at a rising edge or a falling edge, and forwarding an updated device time as the setting time to one or more adjacent node devices before a next rising edge or falling edge arrives;

D, the one or more other adjacent devices updating the device time of their own according to the setting time and the preset algorithm at the rising edge or the falling edge;

E, after all of the node devices have finished updating the device time, the controller sending a control command to each of the node devices, and all of the node devices executing the control command synchronously when an execution time arrives.

2. The method for the device time synchronization control in the wireless mesh network according to claim 1, wherein the step B comprising:

B1, determining whether the controller is currently connecting to an AC power, if so, then executing a step B2, otherwise executing a step B3;

B2, the controller sending the time setting instruction to the one or more adjacent node devices when the pulse signal is at the rising edge or the falling edge;

B3, the controller sending an instruction of acquiring a synchronization flag to the node devices connected to the AC power, and sending the time setting instruction to the one or more adjacent node devices after receiving the synchronization flag fed back by the node devices.

3. The method for the device time synchronization control in the wireless mesh network according to claim 2, wherein the step B3 comprising:

B31, the controller sending an instruction of acquiring the synchronization flag to the node devices connected to the AC power;

B32, the node devices determining whether the instruction of acquiring the synchronization flag is a new instruction or not, and if so, the synchronization flag will be fed back to the controller when the pulse signal is at the rising edge or the falling edge;

B33, the controller sending the time setting instruction to the one or more adjacent node devices after receiving the synchronization flag.

4. The method for the device time synchronization control in the wireless mesh network according to claim 2, wherein the step B2 comprising specifically:

the controller sending the time setting instruction of setting time as T to the one or more adjacent node devices when the pulse signal is at the rising edge or the falling edge, wherein T is a current time.

5. The method for the device time synchronization control in the wireless mesh network according to claim 3, the step B33 comprising specifically:

the controller sending the time setting instruction of setting time as Tc−Tsf to the one or more adjacent node devices, after receiving the synchronization flag, wherein Tc is a time when the controller receiving the synchronization flag, Tsf is a sending period of the synchronization flag.

6. The method for the device time synchronization control in the wireless mesh network according to claim 4, wherein the step C comprising:

C1, determining whether the time setting instruction is a new instruction or not, if so, updating the device time to the setting time plus a pulse signal period, when the pulse signal is at the rising edge or the falling edge;

C2, before the next rising edge or falling edge arrives, forwarding the updated device time to one or more other adjacent node devices as the setting time.

7. The method for the device time synchronization control in the wireless mesh network according to claim 6, wherein the step D comprising specifically:

the one or more other adjacent node devices continuing updating the device time to the setting time plus the pulse signal period, when the pulse signal is at a rising edge or a falling edge, before returning to the step C2, until all of the node devices having finished updating the time.

8. The method for the device time synchronization control in the wireless mesh network according to claim 6, wherein the step C1 comprises:

C11, determining whether a command sequence number of the time setting instruction currently received is greater than a previous command sequence number, and if so, the time setting instruction currently received is determined as a new instruction, and a step C12 will be executed; otherwise, the time setting instruction will not be executed;

C12, Updating the device time to the setting time plus the pulse signal period when the pulse signal is at the rising edge or the falling edge.

9. The method for the device time synchronization control in the wireless mesh network according to claim 1, wherein the step E comprising:

E1, after all of the node devices have finished updating the time, the controller sending a control command containing an executing time number to each of the node devices;

E2, each of the node devices determining if itself is a target device according to the control command or not, if so, then each of the target devices executes the control command synchronously when the device time arrives at the executing time number.

10. A system for the device time synchronization control in the wireless mesh network, comprising a controller and a plurality of node devices, wherein further comprising:

a pulse converter, applied to converting an input AC into a periodic pulse signal;

the controller comprises an instruction transfer module, applied to sending a time setting instruction to one or more adjacent node devices at a preset time;

the node devices comprise a time renewal and forward module, applied to updating a device time according to a preset algorithm when a pulse signal is at a rising edge or a falling edge, and forwarding the updated device time to one or more other adjacent node devices as a setting time, before a next rising edge or falling edge arrives;

the controller further comprises an instruction control module, applied to sending a control command to each of the node devices, when all of the node devices have completed updating the device time;

the node devices further comprise an executing and control module, applied to controlling all of the node devices to execute the control command synchronously when an executing time arrives.

11. The method for the device time synchronization control in the wireless mesh network according to claim 4, wherein the step C comprising:
   C1, determining whether the time setting instruction is a new instruction or not, if so, updating the device time to the setting time plus a pulse signal period, when the pulse signal is at the rising edge or the falling edge;
   C2, before the next rising edge or falling edge arrives, forwarding the updated device time to one or more other adjacent node devices as the setting time.

* * * * *